United States Patent [19]
Maffitt et al.

[11] 4,340,276
[45] Jul. 20, 1982

[54] METHOD OF PRODUCING A MICROSTRUCTURED SURFACE AND THE ARTICLE PRODUCED THEREBY

[75] Inventors: Kent N. Maffitt, Minneapolis, Minn.; Richard F. Willson, Hudson, Wis.

[73] Assignee: Minnesota Mining and Manufacturing Company, Saint Paul, Minn.

[21] Appl. No.: 80,530

[22] Filed: Oct. 10, 1979

Related U.S. Application Data

[63] Continuation-in-part of Ser. No. 957,022, Nov. 1, 1978, abandoned.

[51] Int. Cl.$^3$ .......................... G02B 1/10; C23C 15/00
[52] U.S. Cl. .................................. 350/164; 204/192 P; 204/192 E; 350/276 R; 427/164; 428/148; 428/333; 428/338; 428/339; 428/412; 428/458
[58] Field of Search .................... 204/192 E, 192 EC; 350/276 R, 165, 164; 156/643; 427/164; 428/148, 333, 338, 339, 412, 458

[56] References Cited

U.S. PATENT DOCUMENTS

| | | | |
|---|---|---|---|
| 2,432,434 | 12/1947 | Moulton | 88/1 |
| 2,628,921 | 2/1953 | Weinrich | 117/62 |
| 3,490,982 | 1/1970 | Sauveniere et al. | 161/1 |
| 3,842,306 | 10/1974 | Henderson | 313/116 |
| 3,871,881 | 3/1975 | Mikelsons | 96/1.5 |
| 3,962,495 | 6/1976 | Feldstein | 427/306 |
| 3,975,197 | 8/1976 | Mikelsons | 96/86 R |
| 4,005,698 | 2/1977 | Cuomo et al. | 126/270 |
| 4,013,465 | 3/1977 | Clapham | 96/36 |
| 4,019,884 | 4/1977 | Elmer et al. | 65/30 R |
| 4,054,467 | 10/1977 | Mikelsons | 148/6.3 |
| 4,064,030 | 12/1977 | Nakai et al. | 204/192 E |
| 4,114,983 | 9/1978 | Maffitt et al. | 350/164 |
| 4,130,672 | 12/1978 | Onoki et al. | 427/164 |
| 4,155,826 | 5/1979 | Nakai et al. | 204/192 E |
| 4,160,045 | 7/1979 | Longshore | 427/38 |
| 4,190,321 | 2/1980 | Dorer et al. | 350/165 |

FOREIGN PATENT DOCUMENTS

| | | |
|---|---|---|
| 51-21534 | 2/1976 | Japan. |
| 29561 | of 1904 | United Kingdom. |
| 806381 | 12/1958 | United Kingdom. |
| 1214458 | 12/1970 | United Kingdom. |
| 1441745 | 7/1976 | United Kingdom. |
| 1476284 | 6/1977 | United Kingdom. |
| 1481192 | 7/1977 | United Kingdom. |
| 1485928 | 9/1977 | United Kingdom. |
| 1491746 | 11/1977 | United Kingdom. |
| 1513218 | 6/1978 | United Kingdom. |

OTHER PUBLICATIONS

R. E. Peterson et al., Thin Film Coatings in Solar-Thermal Power Systems, *J. Vac. Sci. Technol.*, vol. 12, No. 1, Jan./Feb. 1975, pp. 174–181.

C. G. Bernhard, The Insect Corneal Nipple Array, *Acta Physiologica Scandinavica*, vol. 63, Supplementum 243, 1965, pp. 1–79.

W. R. Hudson, Ion Beam Texturing, *J. Vac. Sci. Technol.*, vol. 14, No. 1, Jan./Feb. 1977 pp. 286–289.

M. Cantagrei . . . Masks For Ion-Beam Etching, *J. Vac. Sci. Technol.*, vol. 12, No. 6, Nov./Dec. 1975, pp. 1340–1343.

R. S. Berg et al., Surface Texturing by Sputter Etching, *J. Vac. Sci. Technol.*, vol. 13, No. 1, Jan./Feb. 1976, pp. 403–405.

M. J. Mirtich et al., Adhesive Bonding of Ion-Beam-Textured Metals and Fluoropolymers, *J. Vac. Sci. Technol.*, vol. 16, No. 2, pp. 809–812.

*Primary Examiner*—Delbert E. Gantz
*Assistant Examiner*—William Leader
*Attorney, Agent, or Firm*—Cruzan Alexander; Donald M. Sell; William B. Barte

[57] ABSTRACT

A method is disclosed for producing a micro structure on the surface of an article. The method comprises the steps of depositing a discontinuous coating of a material exhibiting a low rate of sputter etching on a substrate exhibiting a higher rate of sputter etching and differentially sputter etching the composite surface to produce a topography of pyramid-like micropedestals random in height and separation. The articles produced by this method are characterized by both the microstructured surface and by the detectable presence of the material exhibiting the lower rate of sputter etching. The microstructured surface results in the articles having uniform antireflecting properties over a large range of angles of incident light and over an extremely broad range of wavelengths, in which the antireflecting characteristic is obtained without an attendant increase in diffuse scattering. Also, the microstructured surface results in the articles being characterized by a high degree of adherence, such that the treated surface may be considered to be "primed", thereby enabling the application of highly adherent coatings or layers thereon.

12 Claims, 8 Drawing Figures

METHOD OF PRODUCING A MICROSTRUCTURED SURFACE AND THE ARTICLE PRODUCED THEREBY

CROSS REFERENCE TO RELATED APPLICATIONS

This application is a continuation-in-part of U.S. Ser. No. 957,022, filed on Nov. 1, 1978 now abandoned, and discloses a microstructured article similar to that disclosed in U.S. Pat. No. 4,114,983, which patent issued Sept. 19, 1978, to K. N. Maffitt, H. U. Brueckner and R. D. Lowrey.

BACKGROUND OF THE INVENTION

The present invention relates to a method for producing an article having a microstructured surface, and the resultant article. The surface of the article thus forms an interface between the article and the adjacent medium, which if of differing indices of refraction, results in enhanced light transmission and decreased reflectance without producing significant diffuse scattering.

Various types of coatings to reduce reflectivity and improve the transparency of articles such as lenses and windows, and to improve the efficiency of solar cells and solar absorption panels are well known. Perhaps the best known are the single, or preferably multiple, layer interference coatings used on optical lenses, filters and as antireflecting films used on windows. While such coatings are desirable in that they are durable and are known to provide an extremely low reflectivity at specific wavelengths, they exhibit a number of limitations. For example, the optical characteristics of such single layer films are highly sensitive to the wavelength, such that multiple layer coatings must be employed. However, if such multiple layer coatings are used, a significant sensitivity to the direction of incident light results. Interference coatings providing antireflecting characteristics which are simultaneously independent of the incident wavelength and in which the antireflection is substantially uniform over a wide range of incident angles, are, therefore, not known. Furthermore, such interferrometric films are relatively expensive to produce, requiring careful control of the thickness of the coating as well as multiple coating operations.

In addition to such articles in which the reflectance therefrom is reduced via a coating having optical interference characteristics, it is also known to provide articles in which the reflectance is reduced by providing a microstructured surface over which the effective index of refraction varies continuously from the substrate to the ambient environment. See, for example, U.S. Pat. No. 2,432,484 (Moulton) and the above referenced patent to Maffitt et al, which patent is assigned to the present assignee. It is believed that the highly sensitive vision of nocturnal insects, such as moths, is at least partly due to the low reflectivity from the surface of the eyes due to the presence of such a microstructure on the surface of the eye. G. C. Bernhard et al, Acta Physiologica Scand., Vol. 63 243, pp. 1-75 (1965).

Another example of a method of producing an antireflective surface utilizing a regular array of microprotuberances is disclosed in U.S. Pat. No. 4,013,465 (Clapham).

Solar collectors utilizing porous coatings to increase the absorptivity and to minimize the radiation loss due to reverse reflected radiation (visible or IR) are also known. It is also known to utilize micropores, grooves or other "textural" effects in such devices to effect an increase in absorptance. J. Vac. Sci. Tech., Vol. 12, No. 1, Jan/Feb (1975). For example, U.S. Pat. No. 3,490,982 (Sauveniere et al) discloses a method of treating a glass surface to provide a microstructured surface exhibiting reduced reflectivity. Commercial acceptance of some of the coatings, surface treatments and the like disclosed in the above cited references have not proven commercially acceptable, possibly due to the instability of the surfaces, cost or inability to provide uniform surfaces over extended areas.

Articles having a microstructured surface are also disclosed in U.S. Pat. No. 4,190,321, (Dorer & Mikelsons) which patent issued Feb. 26, 1980, and is assigned to the same assignee as the present invention. That patent discloses the treatment of an aluminum surface to form thereon an aluminum hydrate, or boehmite composition having a plurality of randomly positioned leaflets which give the treated surface an antireflecting characteristic. In a somewhat similar manner, U.S. Pat. Nos. 3,871,881, 3,975,197 and 4,054,467 disclose prior inventions of Mikelsons in which aluminum surfaces are treated to provide microstructured boehmite surfaces by which other coatings, applied to the aluminum prior to treatment, become tenaciously bonded to the aluminum. Also, U.S. Pat. No. 3,664,888 (Oga et al) depicts an electrochemical process for treating aluminum or aluminum alloy surfaces which etches the surface, leaving minute irregularities and pinhole cavities which are said to provide mechanical anchorage for subsequently applied resin coatings.

SUMMARY OF THE INVENTION

In contrast to prior art microstructured articles such as that of Maffitt et al (U.S. Pat. No. 4,114,983), in which a homogenous polymeric article is provided with a microstructured surface by replication of a master surface into a polymeric material, the present invention is directed to an article in which a durable, microstructured surface is formed directly on the article itself, thus eliminating any need for replication.

Such an article, preferably formed of a variety of polymers such as are increasingly commercially important, is formed, according to the method of the present invention, by first selecting a substrate having a predetermined rate of sputter etching under a given set of sputtering conditions. A material having a lower rate of sputter etching under the same set of conditions is then applied to the substrate in an average thickness in the range of 0.1 to 10 nm, to form a composite surface on which portions of the underlying substrate are exposed between discontinuous microislands of the material. Finally, the composite surface is sputter etched under the given set of sputtering conditions to preferentially etch the exposed portions of the higher sputtering rate substrate, while the discontinuous microislands are etched at a lower rate, resulting in a topography of micropedestals which vary in height within a range of approximately 0.01 and 0.2 $\mu$m and which are separated from adjacent micropedestals a distance within a range of approximately 0.05 to 0.5 $\mu$m. Such a topography of micropedestals has been found to provide a surface exhibiting substantially decreased specular reflectance, without an attendant increase in diffuse scattering as well as providing improved anchorage for subsequently applied coatings.

In a preferred embodiment, the substrate is selected of a substantially transparent organic polymer, such as a clear acrylic. Upon formation of the micropedestals thereon, the resultant surface exhibits enhanced transmittance as well as decreased reflectance. Even when the article per se is not transparent, such as when it includes a substrate on top of another base material, the substrate nonetheless serves as a non-reflecting, non-absorbing conduit to transmit incoming radiation as efficiently as possible, either completely through the article, as in the case of a lens or the like, or into a radiation absorbing member, as in the case of a heat absorber.

Further, it has been found preferable to utilize a refractory metal such as chromium to form the discontinuous islands. When applied to most polymers, such a metal, either in its metallic state or as converted to a metallic oxide, exhibits a rate of sputter etching which is typically at least an order of magnitude less than that of the polymer, thus resulting in the rapid formation of the micropedestals during the sputter etching operation. This operation is desirably carried out in a reactive atmosphere, e.g. oxygen. Such an atmosphere is believed to promote the formation of metallic oxides which frequently have an appreciably lower rate of sputter etching than that of the metal. Also, such a reactive atmosphere is believed to promote general degradation of polymeric substrates such that the rate of sputter etching is increased.

The articles of the present invention are characterized both by the presence of the micropedestals and the attendant reduction in specular reflectance and enchanced adherence properties, but also by the presence of a generally detectable lower sputtering rate material having a lower rate of sputter etching which remains after termination of the sputter etching operation, and which may contribute to the increased interface transmittance.

DETAILED DESCRIPTION OF THE PREFERRED EMBODIMENTS

Figure 1:
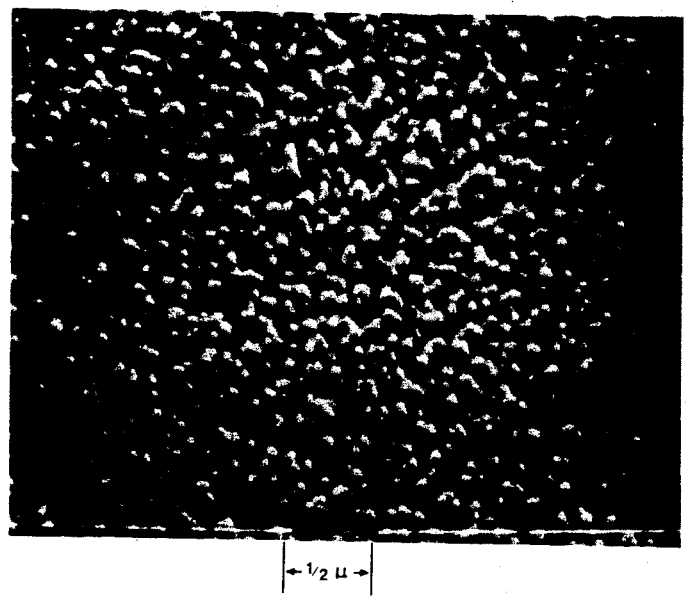
FIG. 1 An electron micrograph of a microstructured surface of an article prepared according to one embodiment of this invention.

In the present invention, a variety of composite surfaces have been found to provide the required differential rates of sputter etching. Such differences in etch rate or sputter yield are controlled by local variations in composition or crystallinity. While the preferred method of producing and controlling such variations is directed to the placement of a discontinuous metal or metal oxide film on an organic polymeric surface, other techniques are similarly within the scope of the present invention. For example, discrete metal particles may be applied to an organic polymer substrate. Such particles, however, are usually relatively large in size and often rearrange in clumps such that the resultant discontinuous microislands are sufficiently large that after the composite surface is sputter etched, the micropedestals are so large that the reflection characteristics of the surface are outside the limits desired of the invention.

Similarly, the sputter etching rate of crystalline polymers has been found to be different in many instances from that of the non-crystalline analog thereof. Accordingly, if a polymer is provided in which both crystalline and non-crystalline regions are present, the difference in sputter etching rate may be utilized to provide the requisite micropedestals. However, since the differences in sputter etching rate for most materials is rather small, the time required to provide the desired amplitude of micropedestals may be much longer than that necessary utilizing other methods.

Another technique involves the preparation of a polymer with metal oxide particles ranging in diameter between 10 and 50 nanometers uniformly dispersed within the polymer. Upon sputter etching, the metal oxide particles will be sputter etched at a rate less than that of a surrounding polymer. However, while such composites are available, the number of polymer choices is somewhat limited, thus restricting the utility of such a technique.

In a preferred embodiment, the structure required to reduce specular reflections below a desired level of 1% per surface across the visible spectrum is random in height within the limits of 0.01 to 0.2 micrometers, and wherein a predominant number of micropedestals in the structure are in the range of 0.1 to 0.2 micrometers. The peak-to-peak separation is also random and preferably ranges between the limitation of 0.05 to 0.5 micrometers, with the preferred separation being in the range of 0.1 to 0.2 micrometers.

In a preferred embodiment, such structures are preferably formed by the following series of steps: A substrate having a range of sputter etching under a given set of sputtering conditions is first selected. Preferably such a substrate is an organic polymer such as polyester, cellulose acetate butyrate, acrylics, and polycarbonates. Onto such a substrate is then applied, such as by vacuum evaporation or sputtering deposition, discontinuous microislands of a material having a rate of sputter etching lower than that of the substrate under the same set of sputter etching conditions. Such a material is applied in an average thickness in the range of 0.1 to 10 nanometers, with a preferred thickness in most cases being less than 2.0 nm. Such an average thickness is sufficiently thin that the material is deposited in the aforementioned discontinuous microislands. While the particular method by which the microislands are formed is not overly critical, it has been found that sputter deposition is preferred due to the fact that improved control is obtainable. Generally, sputter deposition proceeds at a lower rate. Furthermore, sputter deposited material is believed to arrive at the substrate surface with a higher kinetic energy than that of evaporated atoms, for example, and hence have a higher mobility. This higher mobility apparently allows the deposited material to move about on the substrate surface to coalesce with other material, thus remaining as discontinuous microislands having larger average thicknesses than that obtainable with evaporated coatings.

The thus formed composite surface is then sputter etched. Since the discontinuous microislands formed from the deposited films or deposition of fine particles or the like are formed from the materials having a rate of sputter etching which is lower than that of the substrate, the exposed portions of the underlying substrate then etch at a rate which is greater than that of the microislands. This differential etching rate results in the formation of a random topography of micropedestals which vary in height within a range of approximately 0.01 and 0.2 nm. The micropedestals are separated from the adjacent micropedestals a distance within the range of approximately 0.05 to 0.5 nm. The peak-to-peak spacing of the resultant micropedestals is controlled by the spacing of the discontinuous microislands, whereas the overall height of the micropedestals is controlled by a combination of the sputter etching time and power, and the difference in the sputtering yield between the material used to form the microislands and that of the underlying substrate.

The desired differences in the sputter etching rate of the substrate and that of the materials applied to provide the discontinuous microislands thereon is typically in the range of a factor of 10–1000. For example, most suitable polymers have been found to sputter etch at a rate ranging between 150 and 300 nanometers per minute under conditions of approximately 0.4 watts per square centimeter at a pressure of 5 to 10 microns of oxygen. Such sputter etching rates are generally a factor of 2 to 4 times less under similar sputter etching conditions when a partial atmosphere of an inert gas such as argon is used. Where microislands formed of a noble metal are utilized, the sputter etching rate is approximately 1/10 to 1/25 that of typical polymers. If a refractory metal such as chromium is utilized, the sputter etching rate has been found to be typically less than 1/10 that of such polymers, and where a metal oxide is provided, the sputtering rate may be typically as low as one-one hundredth that of the underlying substrate.

While organic polymeric substrates are of primary importance in the present invention, known inorganic substrates are similarly encompassed within the present invention. For example, quartz substrates may be utilized by overcoating the substrate with discontinuous microislands of a polymer, after which the composite surface is differentially sputter etched using a plasma containing a material such as trifluoromethane.

Maximization of differences in etch rate, thus reducing the time required to produce a reflection reducing microstructure on many polymer substrates is best achieved by reactively sputter etching in oxygen. The use of oxygen causes an oxide to form on the discontinuous film coating, thus reducing its etch rate while simultaneously reacting with the polymer and increasing its etch rate. Typically, the etch rate of polymers such as polyester and CR-39 is two to four times higher in oxygen than in argon.

The average film thickness required to form a discontinuous film suitable for production of reflection reducing microstructures is a function of the material being deposited, the composition and structure of the substrate, the substrate temperature, the deposition method and rate and vacuum conditions.

Some non-limiting combinations which have been found to produce the desired microstructures are listed below.

| Substrate Composition | Film Composition | Deposition Method |
|---|---|---|
| Polyester (oriented) | Cr, glass, Al | Sputtering |
| Polyester (amorphous) | Au | Sputtering |
| Cellulose Acetate Butyrate | Glass, Cr | Sputtering |
| Acrylic (Rohm and Haas) Type 147F methyl methacrylate | Cr | Sputtering or Evaporation |
| Polycarbonate | Cr | Sputtering |
| CR-39, a proprietary polycarbonate produced by Pittsburg Plate Glass Inc. (PPG Corp.) especially for optical lens, etc., and which is composed of diallyl glycol carbonate. | | |

As will become more apparent when the results of the specific examples to be discussed later are shown, the method of this invention has the following advantages over heretofore taught methods for producing antireflecting surfaces:

1. The method can be applied to any material that has a sputtering yield higher than that of metal oxides.
2. Microstructure surfaces can be produced on polymers, such as oriented polyester, which are difficult to emboss.
3. The method is adaptable to on-line continuous processing of a web.
4. The resulting microstructured surfaces appear to be more rugged than prior art microstructured surfaces.
5. The need for an expensive mold subject to wear and filling is eliminated.
6. The microstructure dimensions can be varied over a broad range.
7. The substrate may be of any shape so long as the surface can be coated.

A better understanding of the importance of the topographic control of a microstructured surface provided in this invention can be attained by reference to the following specific examples and accompanying figures.

FIG. 1 is a scanning electron micrograph showing a typical microstructured surface of an article of the present invention. As shown in FIG. 1, a typical polymeric optical article according to the present invention has a microstructured surface topographic which can generally be described as a plurality of randomly positioned peaks, a predominant number of which range in amplitude between 0.020 to 0.20 μm. In such articles, the reflectivity is significantly reduced from similar but untreated articles, and if the articles comprise a transparent substrate, the transmissivity is appreciably increased. It is believed that these characteristics are due to a gradation in the index of refraction between that of the medium outside the surface of the article and that of the bulk of the article. In the present invention, the changes in the effective index of refraction varies over a distance ranging between the wavelength of light down to one-tenth that wavelength. Accordingly, it is believed that it is the property of a graded change in the refractive index over this distance which renders the article of the present invention antireflecting, and, under certain conditions, more transmitting over an extended range of optical wavelengths.

EXAMPLE 1

A protective paper covering having a pressure-sensitive backing was stripped from a 15 cm×20 cm×0.16 cm piece of Homalite ® type 911 (an ophthalmic grade polycarbonate, generally known as CR-39) obtained from the SGL Industries Inc. Wilmington, Del. The small amounts of adhesive remaining on the polymer surface were removed by scrubbing the surface using 95% ethanol. The surface was then further cleaned with a mild detergent and water, followed by a water rinse and a final 95% ethanol (0.8 micron filtered) rinse. The sample was blown dry with nitrogen gas and, if not further processed, stored in a clean laminar flow hood until further processing.

Further processing was done in a Vecco ® model 776 radio frequency diode sputtering apparatus operating at a frequency of 13.56 MHz, modified to include a variable impedence matching network. The apparatus included two substantially parallel shielded circular aluminum electrodes 40.6 cm in diameter with a 5 cm gap between them. The electrodes were housed in a glass jar provided with R.F. shielding. The bell jar was evacuatable by means of a mechanical fore/roughing pump with a water cooled trap and oil diffusion pump. The cathode pedestal was cooled by circulating water, and covered by a plate of double strength window glass to prevent sputtering of the underlying aluminum electrodes.

The sample CR-39 panel was centrally attached to the aluminum anode plate by means of small pieces of pressure sensitive adhesive tape at the corners of the sample, with the surface of the CR-39 panel to which a sputtered film was to be applied facing the cathode electrode. The source of the material to be sputter deposited was an evaporated chromium coating in excess of 0.05 μm thick on a plate of double strength window glass, which plate was placed over the glass covered cathode electrode, with the Cr coating facing the CR-39 panel on the anode.

The system was then evacuated to $2 \times 10^{-5}$ torr, and argon gas introduced through a needle valve. An equilibrium pressure of 6 to $9 \times 10^{-3}$ torr was maintained as argon was continuously introduced and pumped through the system.

R.F. energy was capacitively coupled to the cathode, initiating a plasma and was increased until a cathode power density of 0.38 watts/cm$^2$ is reached, thus causing chromium to be sputtered from the cathode and deposited on the opposing anode. The sputter deposition of chromium metal onto the sample was continued for seven minutes±ten seconds. Reflected power was less than 2%. The coupling capacitance was continuously manually adjusted to maintain the above stated power density. Subsequent measurements using an Airco Temescal FDC 8000 Film Deposition Controller to monitor film thicknesses as a function of time under identical conditions revealed that the sputtered discontinuous film was being deposited at a rate of approximately 0.13 nm/minutes. In seven minutes, the average film thickness was, therefore, approximately 0.9 nm.

The R.F power was then shut off, the argon needle valve closed and the system let up to atmospheric pressure using 0.2 micron filtered air. The chromium coated double strength window glass was removed, revealing the clean uncoated glass covering the aluminum cathode plate. The sample was detached from the anode and placed on the clean glass covered cathode such that the surface with sputter deposited chromium on it faced the anode.

The system was next evacuated to $2 \times 10^{-5}$ torr and oxygen introduced by means of a needle valve. An oxygen equilibrium pressures of $6 \times 10^{-3}$ torr was maintained in the system and R.F. energy capacitively coupled to the cathode, initiating a plasma. The energy was increased until a cathode power density of 0.31 watts/cm$^2$ was reached. The reactive sputter etching was continued for 60 seconds±3 seconds.

A microstructured surface consisting of chromium or chromium oxide capped pyramid-like micropedestals having a peak-to-peak spacing small compared with the wavelengths of the visible light, such as shown in FIG. 1, was thus formed.

Figure 2:
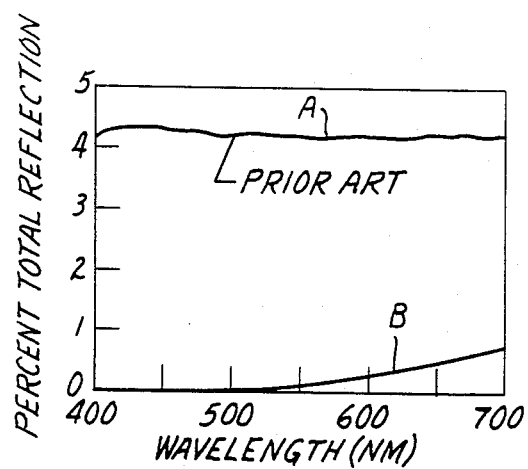
FIG. 2 Curves A and B respectively show the percent of total reflectance as a function of wavelength for a prior art, untreated surface of a polycarbonate article and for surfaces of a polycarbonate article, one surface of which was treated with chromium pursuant to one embodiment of the present invention.
Figure 3:
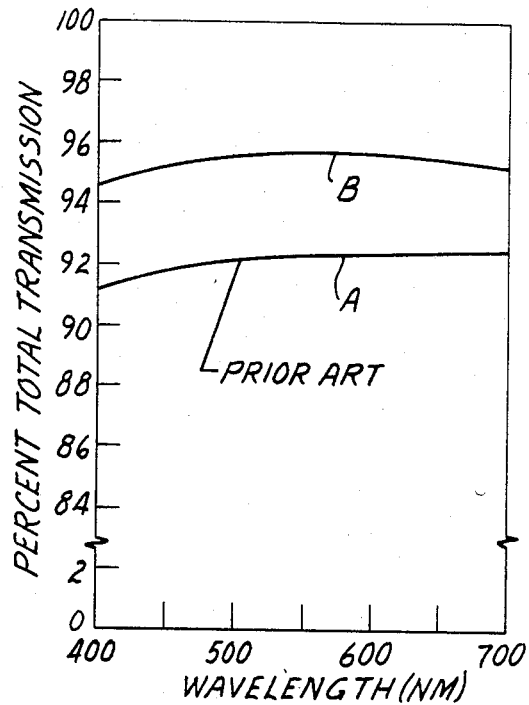
FIG. 3 Curves A and B respectively show the percent of total transmission as a function of wavelength for a prior art untreated polycarbonate article and for a polycarbonate article treated on one surface with chromium pursuant to one embodiment of the present invention.

The articles produced by the method of the present invention as demonstrated in Example 1 are characterized by a marked decrease in interface reflectance, an increase in total transmission, and no significant increase of optical scattering. The reflectivity of the air/substrate interface over the range of wavelengths extending between 400 and 700 nm for a prior art nonstructured CR-39 surface and for the microstructured surface described above is shown in FIG. 2, curves A and B respectively. As can be seen, a dramatic reduction in interface reflectivity resulted, wherein the reflectance is essentially reduced to zero for the 400–520 nm region and does not increase to more than 0.7% for the rest of the wavelength region. In optical elements, it is most often desired to increase the interface transmittance and decrease the specular reflection. In such instances, diffuse reflection is to be avoided. The fact that this is indeed the case for the product of this invention is demonstrated by FIG. 3 in which the transmission for an untreated sheet of CR-39 and the sheet treated as in Example 1 are shown.

Figure 4:
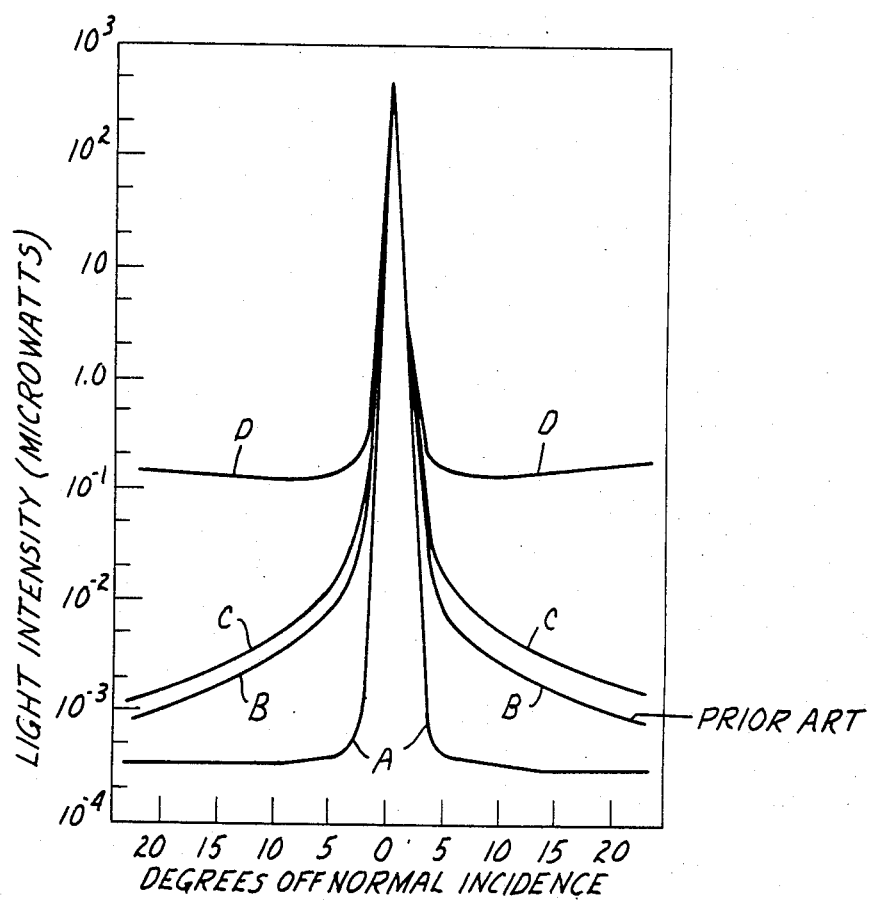
FIG. 4 Curves A, B, C and D, respectively, show extent of diffuse scattering, i.e. scattering as a function of angle off normal incidence for the unscattered beam (A) the extent of scattering for a prior art untreated polycarbonate article (B), a polycarbonate article treated on both surfaces pursuant one embodiment of the present invention (C), and a polycarbonate article treated under conditions outside the limits of the present invention (D)

Further confirmation of the relative lack of diffuse scattering is shown in FIG. 4, where the intensity of light (HeNe laser at a wavelength of 633 nm) scattered from a given object is plotted semilogarithmically as a function of the angle off the normal. In Curve A of FIG. 4, the intensity of the light without an object in the path of the beam is plotted. Curve B shows the scattering of the light for a prior art control panel of CR-39 in which neither surface had been treated. In contrast, Curve C shows the intensity of light scattered from a CR-39 panel where both surfaces were treated as set forth in Example 1. As may there may be seen, the intensity of light scattered at 5° off the normal is approximately five orders of magnitude below the peak intensity at normal. Curve D shows the result when an undesirable surface microstructure is produced. In this case, the differential sputtering was continued for nine minutes, rather than the 60 seconds as in Example 1, to intentionally produce pyramids larger than the preferred range of this invention. As can be seen, the off-normal scattering is approximately two orders of magnitude greater than that for the preferred article. The microstructured surface thus produced according to the method of this invention provides an interface whose reflectivity is relatively independent of the angle of incidence, similar to microstructured surfaces produced by other means, such as, for example, that disclosed in U.S. Pat. No. 4,114,983 (Maffitt et al).

EXAMPLE 2

A CR-39 polycarbonate plano-convex lens blank was substituted for the planar sample of Example 1. Each surface of the lens blank was microstructured according to the procedure outlined in Example 1, except that the sputter deposition of chromium was continued for three minutes and the sputter etching was continued for 90 seconds, rather than the 60 seconds of Example 1. The topography of each surface was observed to be substantially the same as that of FIG. 1. Since each surface is microstructured, the transmission of an optical beam over a wavelength region of 400–700 nm was very near 100%, with essentially no off axis scattering.

EXAMPLE 3

In this Example, a 10 cm×10 cm×0.2 cm piece of Type 147F pure extruded polymethylmethacrylate sheet from E. I. DuPont Corporation was substituted for the polycarbonate substrates of the previous examples. The sheet was scrubbed clean in mild detergent and water as in Example 1. The sample was rinsed in distilled, deionized and filtered water, and subsequently blown dry with nitrogen gas. Chromium was then sputter deposited on the sample as in Example 1; however, the deposition time was continued for five minutes to provide an average film thickness of about 0.6 nm. Further processing was the same as in Example 1, with the exception that the sputter etch time was about 135 seconds. The air/sample interface produced by this method was characterized by a decrease in interface reflectance, increase in interface transmission and no significant increase of optical scattering, similar to the results as produced in Example 1.

EXAMPLE 4

To show the utility of the method of the invention, using other techniques for depositing the discontinuous microislands, in this Example all the materials, processing steps, etc. were the same as in Example 3, except that the discontinuous chromium metal film was produced by resistive evaporation from a tungsten boat in a vacuum of about $2 \times 10^{-5}$ torr. Using aforementioned Airco Temescal FDC 8000 film deposition controller to control the deposition, an indicated film of about 0.1 nm of chromium was deposited. After sputter etching as before, reflectivity of the air/acrylic interface over the wavelength region 400–700 nm was observed to vary from about 1% to 2.5%. Thus a significantly decreased reflectance, and hence improved transmission, was demonstrated, although it was not quite as dramatic as in the preferred sputter deposited case.

EXAMPLE 5

Figure 5:
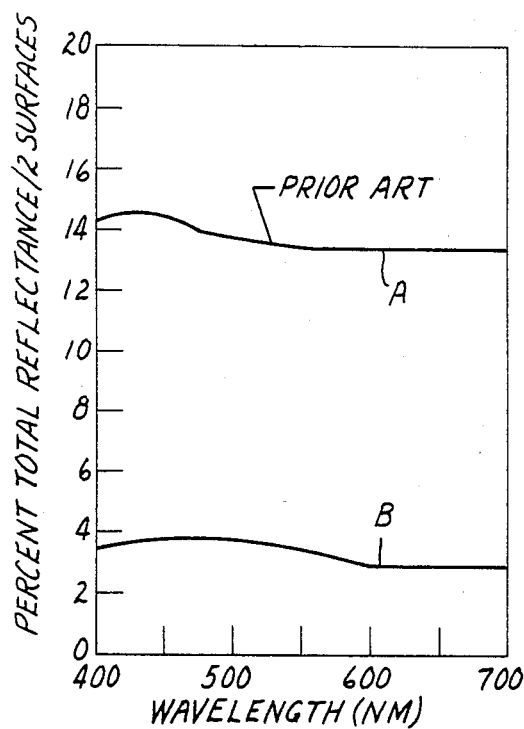
FIG. 5 Curves A and B respectively, show the percent total reflectance as a function of wavelength for prior art untreated surface of an oriented polyester article and for surfaces of an oriented polyester article, both of which were treated using chromium pursuant one embodiment of the present invention.
Figure 6:
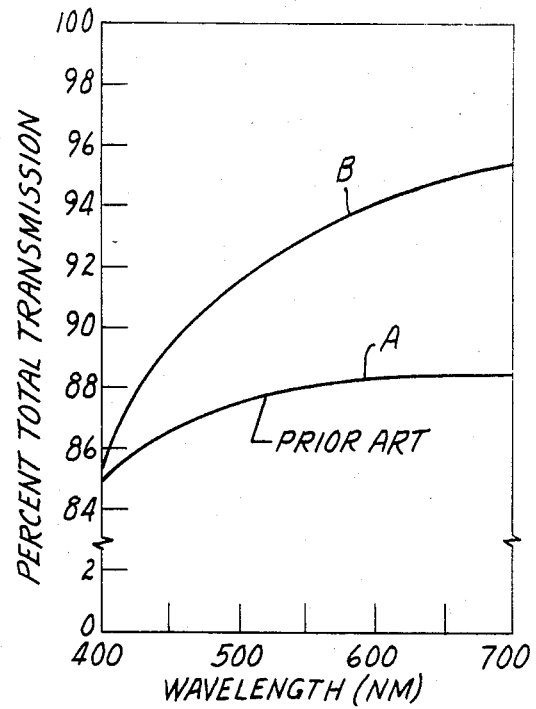
FIG. 6 Curves A and B respectively show the percent total transmission as a function of wavelength for a prior art untreated oriented polyester article and for an oriented polyester article treated on both surfaces with chromium pursuant one embodiment of the present invention.

In this example, both major surfaces of a sheet of 100 µm thick oriented polyester were treated according to the following preferred embodiment of this invention. The surfaces of the polyester were clean as received and thus needed no further cleaning prior to treatment. This sample was treated as in Example 1, except that the discontinuous chromium film was produced by sputter deposition for eight minutes from an evaporated chromium cathode at 0.38 watts/cm$^2$ in $5-6 \times 10^{-3}$ torr of Ar to produce an average thickness of about 1.0 nm. The composite surface was then sputter etched for 105 seconds at 0.31 watts/cm$^2$ in 5 to 6µ oxygen. The results of the interface reflection reduction and the attendant transmission increase are shown in FIGS. 5 and 6. In FIG. 5, curve A shows that the total reflectance from both surfaces of an untreated sheet was about 13%, whereas after the surfaces were thus treated (Curve B), the total reflectance was reduced to about 3%. In FIG. 6, the transmission of an untreated sheet is shown in Curve A. In Curve B the transmission of the treated sheet is shown to be significantly increased.

EXAMPLE 6

Figure 7:
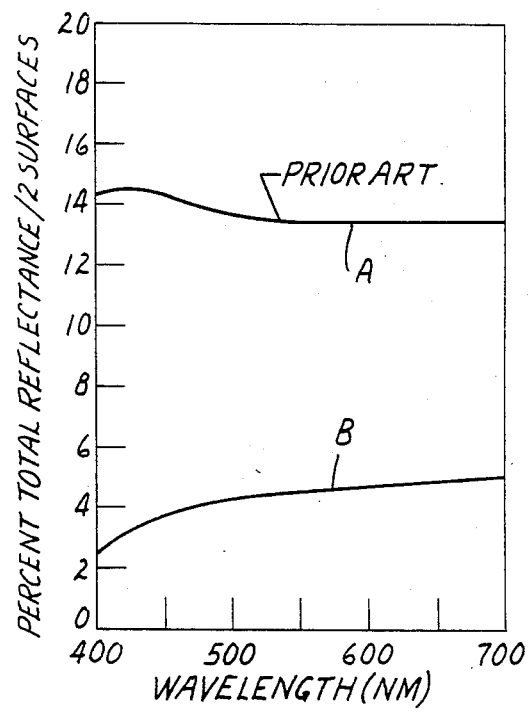
FIG. 7 Curves A and B respectively show the percent total reflectance as a function of wavelength for prior art untreated surfaces of an oriented polyester article and for surfaces of an oriented polyester article, both of which were treated using glass pursuant one embodiment of the present invention.
Figure 8:
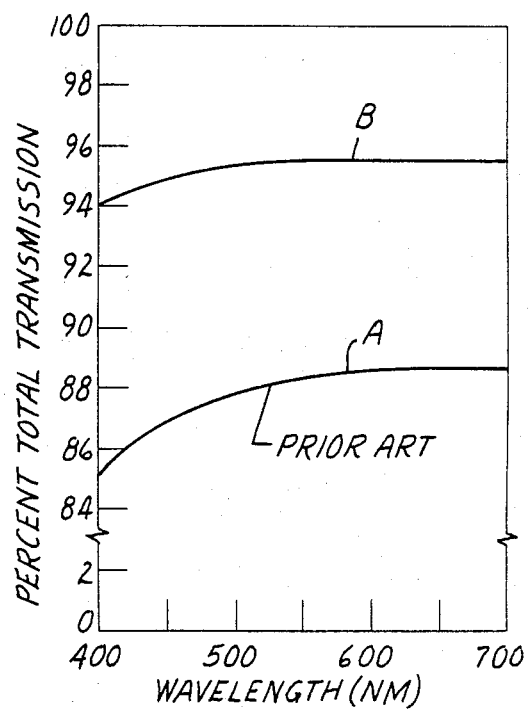
FIG. 8 Curves A and B respectively, show the percent total transmission as a function of wavelength for a prior art untreated oriented polyester article and for an oriented polyester article treated on both surfaces with glass pursuant one embodiment of the present invention.

To show the applicability of the present method using non-metallic materials to provide the discontinuous microislands, in this example microislands of glass were provided. As in Example 5, two major surfaces of a 100 µm thick oriented polyester sheet were treated. The surfaces were clean as received and needed no further cleaning. A discontinuous glass film on the polyester surfaces was produced by sputter deposition for eight minutes from a window glass cathode at 0.38 watts/cm$^2$ in 6 to 7 µm argon to provide a discontinuous glass film having an average thickness of 0.7 nm. The sputter etching was carried out for 150 seconds at 0.31 watts/cm$^2$ in 5 to 6µ oxygen. The optical results for this example are shown in FIGS. 7 and 8, wherein FIG. 7, Curve B, shows a total reflectance of about 4% over the visible spectrum for the treated sample, and FIG. 8, Curve B, shows an attendant increase in transmittance.

EXAMPLE 7

The use of other metals, particularly those which readily convert to a metal oxide having a very low sputter etching rate, is shown in this Example. An oriented polyester sheet as in Examples 5 and 6 was coated on one major surface with a discontinuous layer of aluminum by sputter deposition for ten minutes from an aluminum plate at 0.23 watts/cm$^2$ in $6 \times 10^{-3}$ torr of Ar. Under such conditions, Al is deposited at a rate of about 0.1 nm per minute; hence, a discontinuous film having a average thickness of about 1.0 nm was produced. The composite surface was then sputter etched for four minutes at 0.23 watts/cm$^2$ in $6 \times 10^{-3}$ torr of oxygen. The decrease in reflectance from the treated surface of about 5% and an attendant increase in transmittance of about 4% for the optical wavelength range of 400 to 700 nm was observed.

EXAMPLE 8

The applicability of the present invention to another type polymer and discontinuous film forming material is shown in this Example. Here, a thin, extruded sheet consisting of a layer of an amorphous mixture of 80% terephthalate and 20% isophthalate on an oriented polyester substrate was coated by a 30 second sputter deposition of gold from a gold cathode at 0.38 watts/cm$^2$ in $6 \times 10^{-3}$ torr of Ar to provide an average film thickness of about 2.8 nm. This surface was then sputter etched for one to three minutes at 0.31 watts/cm$^2$ in 5 to $6 \times 10^{-3}$ torr of oxygen. The microstructured surface which was produced resulted in a surface reflectance reduction as in previous examples.

EXAMPLE 9

In this Example, a base resin of Cellulose Acetate Butyrate (CAB) with no additives for extruding was extruded into a rough, approximately 250 μm thick, sheet. The sheet was then thermally flattened in a press at 150° C. and 9 kg/cm$^2$ between chrome plated steel backed plates. The sheet was glass coated by sputter deposition for five minutes from a soft glass cathode in 5 to $6 \times 10^{-3}$ torr of argon at 0.38 watts/cm$^2$ to provide a discontinuous glass film having an average thickness of about 1.2 nm. The coated surface was then sputter etched for three minutes in $6 \times 10^{-3}$ torr of oxygen at 0.31 watts/cm$^2$ to form the microstructured surface. An interface reduction in reflectance and increase in transmittance resulted as in the previous examples.

EXAMPLE 10

The applicability of the invention to a layered substrate is shown in this Example in which a 30% solids solution of CAB and 50/50 MEK and toluene was cast onto a CR-39 substrate and allowed to dry at 30° C. in a nitrogen atmosphere. The sample was then treated as in Example 9, except that it was coated with a discontinuous film of chromium about 0.15 nm thick by sputter deposition for 75 seconds from a chromium cathode at 0.38 watts/cm$^2$ in 6 to $8 \times 10^{-3}$ Torr of Ar. The composite surface was sputter etched for 2.25 minutes at 0.31 watts/cm$^2$ in $8 \times 10^{-3}$ Torr of oxygen. Again, the surface exhibited a decreased reflectance and increased transmittance as a result of the resultant microstructure.

The utility of the present invention to provide a primed surface exhibiting enhanced adhesion is demonstrated in the following additional examples:

EXAMPLE 11

Two $10 \times 30$ cm pieces of 0.762 mm thick Rohm & Haas Brand "Tuffak" polycarbonate film were sputter-etched under the following conditions. Discontinuous microislands of Cr metal were first deposited on the film in an RF diode sputtering apparatus operating at 13.56 MH in an Ar gas plasma. A deposition time of 6 minutes at a power density of 0.4 W/cm$^2$ was used. This was immediately followed by a reactive etch in an O$_2$ gas plasma for 2.5 minutes at a power density of 0.32 W/cm$^2$ to produce a desired microstructure.

One piece of the microstructured polycarbonate film was subjected to an adhesion tape peel test as follows. A 10 cm piece of Scotch brand Magic mending tape was folded over itself for ⅓ of its length. The remaining length of exposed adhesive was firmly adhered to the microstructured polycarbonate surface. The tape was then removed from the surface using a forcible upward motion, resulting in the delamination of the adhesive from the tape backing over the entire impressed microstructured area. No adhesive was delaminated when the same test was performed on the unstructured polycarbonate surface.

The second piece of microstructured polycarbonate was overcoated with an epoxy terminated silane UV polymerizable composition and allowed to cure to provide a hard, abrasion resistant layer. The cured overlayer was scored horizontally and vertically with a minimum of 10 lines/in. over an area at least 2.5 cm$^2$ (cross-hatching). Scotch ® brand Magic transparent tape was then firmly adhered to the scored area. Upon removal of the tape, delamination of the adhesive was observed, with no evidence of removal of the overlayer. The same test applied to a similar overlayer coated onto unstructured polycarbonate film resulted in a 100% removal of the overlayer and no adhesive delamination.

EXAMPLE 12

Two 10 cm $\times$ 10 cm $\times$ 0.63 cm pieces of Homalite ® type 911 Cr-39 (diallyl glycol carbonate), obtained from SGL Industries, were sputter-etched as in Example 11. In this Example, the Cr deposition time was increased to 7 minutes, and the O$_2$ etch time reduced to 1.25 minutes. A microstructure resulted.

One piece of CR-39 was submitted to the adhesive tape peel test as in Example 11. The adhesive applied to the microstructured surface was delaminated from the tape backing, whereas it remained on the tape backing when applied to the unstructured surface.

The second piece of microstructured CR-39 was coated with an epoxy terminated silane composition and allowed to cure as in Example 11. The coated surface was then scored and adhesive tape firmly adhered to it as in Example 11. Upon removal of the tape, the adhesive delaminated, and no evidence of removal or peeling of the coating was noticed. Submitting coated, unstructured CR-39 to the same test resulted in 100% coating removal (failure).

EXAMPLE 13

Two $10 \times 30$ cm pieces of 0.2 cm type 147F acrylic sheet such as described in Example 3 were sputter-etched as in Example 11, except that in this example, microislands of soft glass were deposited over a period of 5.5 minutes. After sputter etching in O$_2$ as in Example 11, a microstructure resulted.

One piece of the microstructured acrylic sheet was subjected to the adhesive tape peel test as described in Example 11. The adhesive was delaminated by the microstructure surface but not by the unstructured surface, in a manner identical to the results in Example 11.

The second piece of microstructured acrylic sheet was also coated with an epoxy-terminated silane composition and allowed to cure. The coated surface was then scored and adhesive tape firmly adhered to it as in Example 11. Upon removal of the tape, no evidence of coating removal or peel was noticed. Submitting a similarly coated, unstructured acrylic sheet to the same test resulted in 100% coated removal (failure).

EXAMPLE 14

Two $10 \times 30$ cm pieces of 0.10 mm polyester film were sputter-etched as in Example 11, except that in this Example the O$_2$ etch time was decreased to 1.75 minutes. A microstructure resulted.

One piece of the microstructured polyester film was subjected to the adhesive tape peel test as described in Example 11. The adhesive applied to the microstructured surface was delaminated, while that applied to the unstructured surface was not.

The second piece of microstructured polyester film was coated with the epoxy-terminated silane composition and allowed to cure. The coated surface was then scored and adhesive tape firmly adhered to it as in Example 11. Upon removal of the tape, no evidence of coating removal or peel was noticed. Submitting coated, unstructured polyester film to the same test resulted in 100% coating removal (failure).

EXAMPLE 15

A 0.076 mm film of polyvinylidene fluoride was RF sputter coated with $SiO_2$ for 6 minutes at 0.38 w/cm$^2$ in 5μ Ar. Subsequently, the masked film was etched in an RF generated oxygen plasma for 3 minutes at 0.31 w/cm$^2$ in 5μ $O_2$ to provide a microstructured surface. When tested in the same manner as in Example 11, the resulting film surface was found to delaminate the adhesive from Scotch Brand Magic Mending Tape, whereas the same test applied to an untreated sample of the same film resulted in no adhesive delamination.

EXAMPLE 16

0.076 mm films of polyethyleneterephthalate and polybutyleneterephthalate were RF sputter coated with $SiO_2$ for 6 minutes at 0.38 w/cm$^2$ in 5μ Ar. The films were then RF sputter etched in an oxygen plasma for 3 minutes at 0.31 w/cm$^2$ and 5μ $O_2$ to provide a microstructured surface. When tested as in Example 11, resulting microstructures were found to delaminate the adhesive from adhesive tape, whereas untreated samples would not delaminate the adhesive when identically tested.

EXAMPLE 17

A 2.5 mm thick piece of nylon resin (Monsanto Vydyne RP-260) was RF sputter coated with 6 min. $SiO_2$ at 0.38 w/cm$^2$ in 5μ Ar. The film was then RF sputter etched in an oxygen plasma for 3 minutes at 0.31 w/cm$^2$ and 5μ $O_2$ to provide a microstructured surface. The resulting surface was tested as before and was found to delaminate adhesive from the adhesive tape, whereas the untreated surface would not.

EXAMPLE 18

A 2.5 mm piece of acrylonitrile-butadienestyrene copolymer was RF sputter coated with 6 minutes $SiO_2$ at 0.38 w/cm$^2$ in 5μ Ar. The film was then RF sputter etched in an oxygen plasma for 3 minutes at 0.31 w/cm$^2$ in 5μ $O_2$ to provide a microstructured surface. This surface was again found to delaminate the adhesive from the adhesive tape while an untreated sample did not.

EXAMPLE 19

A 2.5 mm piece of a phenylene oxide-based resin (Noryl ®) (type PN-235 manufactured by G. E. Corp.) was RF sputter coated with 6 minutes $SiO_2$ at 0.38 w/cm$^2$ in 5μ Ar. The sample was then RF sputter etched in an oxygen plasma for 3 minutes at 0.31 w/cm$^2$ in 5μ $O_2$ to provide a microstructured surface. As in the preceding examples, the treated surface was found to delaminate adhesive from the adhesive tape while an untreated sample did not.

Having thus described the present invention, what is claimed is:

1. A method for forming a microstructured surface having antireflective characteristics comprising
   (a) selecting a substantially transparent, polymeric substrate having a predetermined rate of sputter etching under a given set of sputtering conditions;
   (b) applying onto said substrate discontinuous microislands of a material selected from the group consisting of metal oxides, refractory metals, and noble metals, having a rate of sputter etching lower than said predetermined rate under said given set of sputtering conditions to form a composite surface on which portions of the underlying substrate are exposed between the discontinuities of said microislands, said material being applied in an average thickness in the range of 0.1 to 10 mm; and
   (c) sputter etching said composite surface under said given set of sputtering conditions in a partial atmosphere of a reactive gas to promote the formation of a top layer on said microislands having a desirably low sputtering rate and to preferentially etch the exposed portions of the substrate, while said discontinuous microislands are etched at a lower rate, resulting in a random topography of micropedestals which vary in height within a range of approximately 0.01 to 0.2 μm, and are separated from adjacent micropedestals a distance within a range of approximately 0.05 to 0.5 μm and which exhibit substantially decreased specular reflectance without an attendant increase in diffuse scattering.

2. A method according to claim 1, comprising applying said discontinuous islands by vapor deposition onto said substrate of a said material having a said lower rate of sputter etching.

3. A method according to claim 1, comprising applying said discontinuous islands by sputtering onto said substrate a said material having a said lower rate of sputter etching.

4. A method according to claim 1 comprising applying microislands of chromium, aluminum or glass.

5. A method according to claim 1, further comprising the step of cleansing said substrate prior to applying said microislands to remove contaminating oils, particulate matter or the like which may provide non-uniform conditions affecting the steps of applying said microislands or said sputter etching.

6. A method according to claim 1, comprising sputter etching said composite surface in a partial atmosphere of oxygen.

7. A method according to claim 1 wherein said step of sputter etching comprises positioning said substrate on the cathode electrode of an RF diode sputtering apparatus, enclosing said electrode within an evacuatable container, evacuating said container to a pressure less than $10^{-4}$ torr, backfilling with oxygen to a pressure in the range of $10^{-2}$ torr, coupling RF between the anode and cathode electrodes of said apparatus to initiate a plasma therebetween, and maintaining said plasma at a predetermined power density level for a given duration of time.

8. A method according to claim 1 wherein said applying step comprises:
   (a) providing an RF sputtering apparatus having within an evacuatable container substantially parallel and separate cathode and anode electrodes,
   (b) positioning said substrate on said anode electrode,
   (c) positioning a source of said lower sputter etching rate material on said cathode electrode, said source having overall dimensions at least as large as said substrate and having a surface profile substantially like that of the exposed surface of said substrate such that all portions thereof are substantially equispaced from said source, (d) enclosing said electrodes within said container and establishing therein a partial atmosphere of an inert gas at a pressure in the range of $10^{-2}$–$10^{-3}$ torr, (e) coupling RF between the electrodes to initiate a plasma therebetween and maintaining said plasma at a predetermined power density level for a given duration of time during which said source material is sputter deposited onto said exposed surface to form said microislands.

9. A method according to claim 1, wherein said selecting step comprises forming said substrate on a separate base member.

10. An optical article having a microstructured surface thereon exhibiting antireflective characteristics, said article comprising a substantially transparent, polymeric substrate characterized by a predetermined rate of sputter etching under a given set of sputtering conditions and having thereon a random topography of discrete micropedestals varying in height within a range of approximately 0.01 and 0.2 μm, randomly separated from adjacent micropedestals a distance within a range of approximately 0.05 to 0.5 μm, wherein said micropedestals have associated therewith a generally detectable material comprising metal oxides, noble metals, and mixtures and alloys thereof, said material having a rate of sputter etching lower than said predetermined rate under said given set of sputtering conditions, and wherein said topography results in a said microstructured surface which exhibits substantially decreased specular reflectance without an attendant increase in diffuse scattering resulting in enhanced transmissivity.

11. An article comprising a substantially transparent, polymeric substrate characterized by a predetermined rate of sputter etching under a given set of sputtering conditions and having thereon a topography of discrete micropedestals varying in height within a range of approximately 0.01 and 0.2 μm, randomly separated from adjacent micropedestals a distance within a range of approximately 0.05 to 0.5 μm, said micropedestals having associated therewith a generally detectable material comprising metal oxides, noble metals and mixtures and alloys thereof, said material having a rate of sputter etching lower than said predetermined rate under said given set of sputtering conditions, and a layer bonded to said substrate, wherein the presence of said micropedestals results in enhanced bonding of said layer while also providing an interface between the substrate and layer, having a gradation in the optical index of refraction such that the interface is substantially invisible.

12. An article according to claim 11, comprising a substrate selected from an optical grade polymer or copolymer of polycarbonate having said micropedestals covering at least one surface thereof and having a said layer consisting of an abrasion resistant top-coat selected from the group consisting of epoxy-functional silanes and acryloxy or methacryloxy.

* * * * *